US011174396B2

(12) United States Patent
Otsuki et al.

(10) Patent No.: US 11,174,396 B2
(45) Date of Patent: Nov. 16, 2021

(54) ELECTROSTATIC POWDER COATING MATERIAL, COATED ARTICLE HAVING COATING FILM, AND METHOD FOR PRODUCING SAME

(71) Applicant: Nihon Parkerizing Co., Ltd., Tokyo (JP)

(72) Inventors: Tetsuo Otsuki, Tokyo (JP); Yukihiro Ueda, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 17 days.

(21) Appl. No.: 16/629,675

(22) PCT Filed: Jul. 11, 2018

(86) PCT No.: PCT/JP2018/026144

§ 371 (c)(1),
(2) Date: Jan. 9, 2020

(87) PCT Pub. No.: WO2019/013242

PCT Pub. Date: Jan. 17, 2019

(65) Prior Publication Data

US 2021/0079229 A1 Mar. 18, 2021

(30) Foreign Application Priority Data

Jul. 12, 2017 (JP) ............................ JP2017-135892

(51) Int. Cl.

| | |
|---|---|
| ***C09D 5/03*** | (2006.01) |
| ***B05D 1/06*** | (2006.01) |
| ***B05D 3/02*** | (2006.01) |
| ***B05D 7/24*** | (2006.01) |
| ***C09D 1/00*** | (2006.01) |

(52) U.S. Cl.

CPC ................ *C09D 5/03* (2013.01); *B05D 1/06* (2013.01); *B05D 3/02* (2013.01); *B05D 7/24* (2013.01); *C09D 1/00* (2013.01)

(58) Field of Classification Search

None

See application file for complete search history.

(56) References Cited

U.S. PATENT DOCUMENTS

| | | | |
|---|---|---|---|
| 2004/0241443 | A1 | 12/2004 | Decker et al. |
| 2017/0087584 | A1 | 3/2017 | Agata et al. |
| 2017/0087588 | A1 | 3/2017 | Goto et al. |
| 2017/0087589 | A1 | 3/2017 | Yoshino et al. |
| 2017/0088929 | A1 | 3/2017 | Seitoku et al. |

FOREIGN PATENT DOCUMENTS

| | | | |
|---|---|---|---|
| JP | S51-60227 | A | 5/1976 |
| JP | S58-34069 | A | 2/1983 |
| JP | 2005-162929 | | 6/2005 |
| JP | 2006-518416 | A | 8/2006 |
| JP | 2017-60914 | A | 3/2017 |
| JP | 2017-60915 | A | 3/2017 |
| JP | 2017-60919 | A | 3/2017 |
| JP | 2017-60920 | A | 3/2017 |

OTHER PUBLICATIONS

Search Report in International Application No. PCT/JP2018/026144 dated Sep. 4, 2018, 5 pages.

International Preliminary Report on Patentability and Written Opinion in International Application No. PCT/JP2018/026144 dated Jan. 23, 2020, 9 pages.

*Primary Examiner* — Shamim Ahmed
*Assistant Examiner* — Bradford M Gates
(74) *Attorney, Agent, or Firm* — Marshall, Gerstein & Borun LLP

(57) ABSTRACT

The present invention is aimed at providing an unprecedented novel electrostatic powder coating material. Provided is an unprecedented electrostatic powder coating material capable of forming a heat-resistant coating film, wherein the electrostatic powder coating material contains at least glass particles (A) that soften at a baking temperature and glass particles (B) that do not soften at the baking temperature.

4 Claims, No Drawings

ELECTROSTATIC POWDER COATING MATERIAL, COATED ARTICLE HAVING COATING FILM, AND METHOD FOR PRODUCING SAME

TECHNICAL FIELD

The present invention relates to a novel electrostatic powder coating material containing a plurality of types of glass particles. The present invention also relates to a method for producing a coated article having a coating film using the electrostatic powder coating material, and a coated article having the coating film.

BACKGROUND ART

An electrostatic powder coating method is expected to provide a uniform finish since it causes less scattering of a coating material as compared to an ordinary spray coating method and adheres the coating material to the entirety of an article to be coated regardless of the direction and irregularities. Because of this background, a variety of electrostatic powder coating materials suitable for the electrostatic powder coating method have been actively developed.

In Patent Document 1, a powder primer composition for electrostatic powder coating, which contains a prescribed polyester resin, an epoxy resin, a prescribed phosphoric acid-modified epoxy resin and a rust-preventive pigment, was developed. Further, in Patent Documents 2 to 5, electrostatic powder coating materials, which include powder particles containing a thermosetting resin, a heat curing agent and the like, were developed.

RELATED ART DOCUMENTS

Patent Documents

[Patent Document 1] Japanese Unexamined Patent Application Publication No. 2005-162929

[Patent Document 2] Japanese Unexamined Patent Application Publication No. 2017-60914

[Patent Document 3] Japanese Unexamined Patent Application Publication No. 2017-60915

[Patent Document 4] Japanese Unexamined Patent Application Publication No. 2017-60919

[Patent Document 5] Japanese Unexamined Patent Application Publication No. 2017-60920

SUMMARY OF THE INVENTION

Problems to be Solved by the Invention

As electrostatic powder coating materials have been actively developed as described above, an object of the present invention is to provide: an unprecedented novel electrostatic powder coating material; a method for producing a coated article having a coating film using the electrostatic powder coating material; and a coated article having the coating film.

Means For Solving The Problems

In order to solve the above-described problem, the present invention encompasses the followings.

(1) An electrostatic powder coating material, containing at least glass particles (A) and glass particles (B) which have different softening points, and forming a coating film on an article to be coated by baking, wherein the glass particles (A) soften at a baking temperature, while the glass particles (B) do not soften at the baking temperature.

(2) The electrostatic powder coating material according (1), wherein the glass particles (B) are glass particles having pores and/or voids.

(3) A method for producing a coated article having a coating film, the method including: a step of applying, by an electrostatic powder coating method, the electrostatic powder coating material according to (1) or (2) onto an article to be coated; and a step of baking the thus applied electrostatic powder coating material at a baking temperature.

(4) A coated article having a coating film, which is obtained by forming the coating film by a process including: a step of applying, by an electrostatic powder coating method, the electrostatic powder coating material according to (1) or (2) onto an article to be coated; and a step of baking the thus applied electrostatic powder coating material at a baking temperature.

Advantageous Effects of the Invention

According to the present invention, an unprecedented novel electrostatic powder coating material; a method for producing a coated article having a coating film using the electrostatic powder coating material; and a coated article having the coating film can be provided.

DESCRIPTION OF EMBODIMENTS

An electrostatic powder coating material; a method for producing a coated article having a coating film formed by applying the electrostatic powder coating material onto an article to be coated and baking the electrostatic powder coating material; and a coated article obtained by the method; according to embodiments of the present invention will now be described in detail.

1. Electrostatic Powder Coating Material

The electrostatic powder coating material according to one embodiment of the present invention is a coating material which forms a coating film on an article to be coated by baking, and does not substantially contain any solvent (a liquid component such as water or an organic solvent) but contains at least glass particles (A) and glass particles (B) that have different softening points. The glass particles (A) are glass particles that soften at a baking temperature, while the glass particles (B) are glass particles that do not soften at the baking temperature. In this manner, by incorporating the glass particles (A) and (B) having different softening points and allowing the glass particles (A) to soften at a baking temperature, the glass particles (A) can function as a binder at the baking temperature, so that a coating film can be formed.

The electrostatic powder coating material may also contain other component(s) as appropriate in addition to the above-described glass particles (A) and (B). The components contained in the electrostatic powder coating material will now be described.

<Glass Particles (A)>

The composition of the glass particles (A) is not particularly restricted as long as the glass particles (A) have a softening point different from that of the below-described glass particles (B) and soften at a baking temperature.

As the glass particles (A), for example, commercially available glass particles, such as GLASS FRIT LS-5-300M and K-303 manufactured by AGC Inc., and GLASS FRIT EY0077 and CK5425 manufactured by Nippon Frit Co., Ltd., can be used. Two or more kinds of glass particles that have different compositions and soften at a baking temperature may be blended as the glass particles (A).

The glass particles (A) soften at a baking temperature and thus have a softening point that is lower than the baking temperature. The term "softening point" used herein refers to a temperature at which the glass of interest is deformed by its own weight. This temperature corresponds to a viscosity of $10^{7.65}$ poise, and the softening point of a glass can be measured in accordance with JIS R3103-1.

The softening point of the glass particles (A) is lower than a baking temperature preferably by 10° C. or more, more preferably by 50° C. or more, still more preferably by 100° C. or more. Specifically, the softening point is usually 300° C. or higher, preferably 350° C. or higher, more preferably 400° C. or higher, and usually 850° C. or lower, preferably 750° C. or lower, more preferably 650° C. or lower. Further, the difference between the softening point of the glass particles (A) and the softening point of the below-described glass particles (B) not softening at the baking temperature is preferably 20° C. or more, more preferably 60° C. or more, still more preferably 110° C. or more, particularly preferably 150° C. or more.

The shape of the glass particles (A) is not particularly restricted as long as it is a particulate shape, and the glass particles (A) may take any shape, such as a true spherical shape, a substantially spherical shape, a rod shape, a flake shape, a plate shape, a scale-like shape, a hollow shape or a porous shape, or a mixture of these shapes. From the standpoint of the ease of softening, glass particles having a thin flake shape, a plate shape, a scale-like shape or the like may be used as well.

The particle size (median diameters: d50 and d90) of the glass particles (A) is not particularly restricted, and the d50 may be 5 μm or more and 50 μm or less and is preferably 5 μm or more and 30 μm or less. The value of d90/d50 is also not particularly restricted; however, it is preferably 8 or less, more preferably 4 or less. When a plurality of types of glass particles are used as the glass particles (A), glass particles of different particle sizes may be used in combination as well. The particle size of the glass particles (A) can be measured using a particle size distribution analyzer. As the particle size distribution analyzer, for example, a laser diffraction-scattering particle size distribution analyzer LA-960 manufactured by HORIBA, Ltd. can be employed.

The linear expansion coefficient of the glass particles (A) is not particularly restricted as long as it is in a range of the linear expansion coefficient of an ordinary glass, for example, in a range of 10.0 to $15.0\times10^{-6}$/K.

Further, the glass particles (A) may be surface-treated as required. For example, the glass particles (A) may be surface-treated for the purpose of inhibiting secondary aggregation.

<Glass Particles (B)>

The composition of the glass particles (B) is not particularly restricted as long as the glass particles (B) have a softening point different from that of the above-described glass particles (A) and do not soften at a baking temperature. The shape of the glass particles (B) is also not particularly restricted; however, from the standpoint of reducing the thermal conductivity of the resulting coating film, the glass particles (B) are preferably glass particles having pores and/or voids. A typical example of glass particles having pores is a porous glass, and a typical example of glass particles having voids is a hollow glass; however, the glass particles (B) are not restricted thereto as long as they have pores and/or voids. It is noted here that the term "hollow" used herein refers to a structure having a cavity inside, which may be, for example, a spherical or doughnut structure having a cavity inside. Further, the term "porous" used herein refers to a structure having a large number of pores inside.

The glass particles (B) may be any glass particles as long as they have a softening point different from that of the above-described glass particles (A) and do not soften at a baking temperature, and the glass particles (B) may be any of the glass particles exemplified above for the glass particles (A). In addition, as a hollow glass, a commercially available hollow glass, such as hollow glass beads SPHERICEL 60P18 or 45P25 manufactured by Potters-Ballotini Co., Ltd. or hollow glass beads GLASS BUBBLES S42XHS or iM30K manufactured by 3M Japan Ltd., may be used. Further, as a porous glass, a commercially available porous glass, such as a porous silica SUNSPHERE H-51 manufactured by AGC Si-Tech Co., Ltd. or a porous silica SYLOSPHERE C-1510 manufactured by Fuji Silysia Chemical Ltd., may be used.

Two or more types of glass particles that have different compositions and do not soften at a baking temperature may be blended as the glass particles (B).

The particle size (median diameters: d50 and d90) of the glass particles (B) is not particularly restricted, and the d50 may be 5 μm or more and 50 μm or less and is preferably 5 μm or more and 30 μm or less. The value of d90/d50 is also not particularly restricted; however, it is preferably 8 or less, more preferably 4 or less. When a plurality of types of glass particles are used as the glass particles (B), glass particles of different particle sizes may be used in combination as well.

The glass particles (B) do not soften at a baking temperature and thus have a softening point that is higher than the baking temperature.

The softening point of the glass particles (B) is higher than the baking temperature preferably by 10° C. or more, more preferably by 50° C. or more, still more preferably by 100° C. or more. Specifically, the softening point is usually 320° C. or higher, preferably 400° C. or higher, more preferably 500° C. or higher, and usually 2,000° C. or lower, preferably 1,500° C. or lower, more preferably 1,000° C. or lower.

When a hollow glass is used as the glass particles (B), the glass thickness thereof (glass thickness from the outer edge of each particle to the cavity inside) may be, for example, 0.5 μm or more and 1.5 μm or less. The void ratio of the hollow glass may be, for example, 30% by volume or more, or 50% by volume or more. An upper limit thereof is not restricted; however, since the impact resistance is poor when the void ratio is excessively high, the void ratio is usually 85% by volume or less, and may be 80% by volume or less.

Further, when a porous glass is used as the glass particles (B), the specific surface area thereof (BET specific surface area) may be, for example, 300 $m^2$/g or more, or 500 $m^2$/g or more. An upper limit thereof is not restricted; however, since the impact resistance is poor when the specific surface area is excessively large, the specific surface area is usually 1,000 $m^2$/g or less.

The glass particles (B) do not soften at a baking temperature and thus contribute to the strength of the resulting coating film. Accordingly, the pressure resistance of the glass particles (B) may be usually 20 MPa or more, preferably 50 MPa or more, more preferably 80 MPa or more.

The glass particles (B) may be surface-treated as required. For example, the glass particles (B) may be surface-treated for the purpose of inhibiting secondary aggregation.

<Other Components>

In the electrostatic powder coating material according to the present embodiment, additives and the like that are generally used in electrostatic powder coating materials may be incorporated as components other than the above-described glass particles (A) and (B). Examples of such components include fluidity modifiers and fluidity-imparting agents (e.g., fine particulate silica) that can control the fluidity of the electrostatic powder coating material by adhering to the surfaces of the glass particles (A) and (B), such as dry silica REOLOSIL manufactured by Tokuyama Corporation.

In addition, various pigments, such as white pigments and red pigments, may be added for the purpose of imparting a design to the resulting coating film. Moreover, various resin components may be incorporated into the electrostatic powder coating material; however, the electrostatic powder coating material may be in a mode of containing no resin at all.

<Method for Producing Electrostatic Powder Coating Material>

The electrostatic powder coating material according to the present embodiment can be produced by blending the above-described glass particles (A) and (B) at a prescribed ratio, adding thereto the above-described other components as required, and subsequently mixing the resultant.

A mixing method is not particularly restricted, and a known method can be applied. For example, the mixing can be performed using a commercially available container rotary mixer, and the mixing time, the mixing temperature and the like can be set as appropriate by a person skilled in the art.

As for the blending ratio of the glass particles (A) and (B), the glass particles (A) may be blended in an amount that is required for the glass particles (A) to function as a binder. Specifically, the content of the glass particles (A) with respect to a total amount of the electrostatic powder coating material may be 40% by weight or more and 95% by weight or less, and it is preferably 50% by weight or more and 90% by weight or less. Further, the content of the glass particles (B) with respect to a total amount of the electrostatic powder coating material may be 1% by weight or more and 50% by weight or less and, from the standpoint of the heat resistance of the resulting coating film, it is preferably 5% by weight or more and 30% by weight or less.

2. Method for Producing Coating Film

A coating film is produced by performing the coating step of applying the above-described electrostatic powder coating material onto an article to be coated and the baking step of baking the thus applied electrostatic powder coating material at a baking temperature, whereby a coated article having the coating film can be obtained.

By baking the applied electrostatic powder coating material, the glass particles (A) are softened to function as a binder, and a coating film including the glass particles (B) that are not softened is formed.

<Article to be Coated>

The shape of the article to be coated is not particularly restricted, and the article to be coated may be an unmolded plate material or a molded article. The material thereof is also not particularly restricted, and examples thereof include metal materials, such as iron, aluminum, titanium, magnesium, nickel, copper, silver, gold, and alloys containing any of these metals as a main component. Examples of the material also include non-metallic materials, such as glasses, ceramics, and heat-resistant plastics. Further, when an insulating material is used, a conductive treatment is desirably performed on its surface so as to eliminate static electricity. Examples of the conductive treatment include electroless plating and vacuum deposition.

<Coating Step>

A method for applying the electrostatic powder coating material, a general electrostatic powder coating method can be employed. The term "electrostatic powder coating method" used herein means that a method in which the electrostatic powder coating material in a charged state is sprayed from an electrostatic powder coating gun and brought into contact with an ungrounded article to be coated through an electrostatic force generated by a charge.

A coating apparatus to be used for the electrostatic powder coating method is not particularly restricted, and a general electrostatic powder coating apparatus can be employed. One example thereof is an electrostatic powder coating apparatus GX-8500αβ manufactured by Parker Engineering Co., Ltd.

It is noted here that the electrostatic powder coating using the electrostatic powder coating material is preferably performed while mixing the electrostatic powder coating material.

Further, in order to clean the surface of the article to be coated and to adjust the surface roughness of the surface, for example, a pretreatment(s), such as degreasing, acid washing, grinding and/or blasting, may be performed as well.

<Baking Step>

A method for baking the thus applied electrostatic powder coating material is not particularly restricted, and a general baking method can be employed. Examples thereof include a baking method using a baking apparatus such as a hot-air drying furnace, and a baking method performed by means of far-infrared heating, high-frequency heating or the like.

The baking temperature may be set as appropriate in accordance with the article to be coated, and it is not particularly restricted as long as it is a temperature at which the glass particles (A) can function as a binder that holds the glass particles (B). The baking temperature is usually in a range of 310° C. or higher and 950° C. or lower, preferably in a range of 350° C. or higher and 800° C. or lower. Specifically, the baking temperature may be higher than the softening point of the glass particles (A) by 10° C. or more, preferably by 50° C. or more, more preferably by 100° C. or more. At the same time, the baking temperature is required to be a temperature that is not higher than the softening point of the glass particles (B) and does not cause deformation of the article to be coated.

The baking time varies depending on the baking temperature, and it is not particularly restricted as long as the glass particles (A) can function as a binder that holds the glass particles (B). When the baking temperature is higher than the softening point of the glass particles (A) by 100° C., typically, the baking may be performed for 10 minutes or more and 5 hours or less.

After the above-described baking step, a post-treatment may be performed as appropriate. Examples of the post-treatment include treatments performed on the resulting coated article, such as surface roughness adjustment, wettability adjustment, and coloring. More specific examples include a polishing treatment of the coated surface, a hydrophilic treatment of the coated surface, a water-repelling treatment of the coated surface, and color coating on the coated surface.

The thickness of the coating film of the coated article is not particularly restricted and may be set as appropriate in accordance with the intended use; however, it is usually 20 μm to 500 μm, preferably 30 μm to 200 μm, more preferably 50 μm to 150 μm.

When glass particles having pores such as a hollow glass or a porous glass are used as the glass particles (B), voids are provided in the resulting coating film, so that the thermal conductivity of the coating film can be reduced. The void ratio of the coating film may be, for example, 5% by volume to 50% by volume, and it is preferably 10 to 30% by volume.

The void ratio of the coating film can be determined from a micrograph of a cross-section of the coating film by measuring the area of the whole coating film and the area of the glass particles (B) and calculating the ratio thereof. Considering the possibility of localization of voids in the coating film, it is preferred to measure the void ratio of a cross-section randomly at three or more spots, preferably five or more sports, more preferably ten or more spots, and adopt an average of the measured values.

3. Coated Article

A coated article having a coating film can be obtained by applying the above-described method for producing a coating film to an article to be coated. Coated articles obtained in this manner are useful as components in the aerospace industry, components in the aviation industry, automobile parts, building members, cocking wares, and the like. Especially, those coated articles having good heat resistance are particularly useful as components in the aerospace industry, components in the aviation industry, automobile parts, and the like.

EXAMPLES

The present invention will now be described in more detail by way of concrete Examples thereof. The scope of the present invention is, however, not restricted by the following Examples.

<Article to be Coated>

As an article to be coated, a stainless steel sheet SUS304 manufactured by Paltec Co., Ltd. (2B finishing, 70 mm×150 mm×0.8 mm) was used.

<Pretreatment of Article to be Coated>

Using FINE CLEANER E6408 manufactured by Nihon Parkerizing Co., Ltd., oil and dirt were removed from the article to be coated. Subsequently, pure water was poured onto the article to be coated, after which the article to be coated was heated in an oven having a 100° C. atmosphere to remove water.

Example 1

<Method for Producing Electrostatic Powder Coating Material of Example 1>

Glass particles (A): GLASS FRIT K-303 manufactured by AGC Inc. (softening point=431° C., median diameter d50=8.0 μm, linear expansion coefficient=$12.9\times10^{-6}$/K) and glass particles (B): hollow glass beads SPHERICEL 60P18 manufactured by Potters-Ballotini Co., Ltd. (softening point=830° C., median diameter d50=18 μm, pressure resistance=55 MPa) were mixed at a ratio (A):(B) of 70% by weight:30% by weight using a container rotary mixer, and the resulting mixture was used as the electrostatic powder coating material of Example 1.

<Method for Producing Coating Film Using Electrostatic Powder Coating Material of Example 1>

The thus prepared electrostatic powder coating material of Example 1 was sprayed to the article to be coated, which was horizontally placed, from directly above using an electrostatic powder coating apparatus GX-8500αβ and an electrostatic powder coating gun (slit nozzle) GX132 that were manufactured by Parker Engineering Co., Ltd. In this process, the gun voltage, the gun current value, the discharge amount of the coating material and the air flow rate for transferring the coating material were set at 100 kV, 35 μA, 50% and 50 L/min, respectively, and the distance between the nozzle of the gun and the article to be coated was set at 300 mm.

Subsequently, the article to be coated that was sprayed with the electrostatic powder coating material of Example 1 was baked in an electric muffle furnace (FUW220PA manufactured by Advantec Toyo Kaisha, Ltd.). As for the baking conditions, the baking temperature was 500° C., the heating time was 30 minutes, and the retention time at the baking temperature was 1 hour. After the baking, the power of the furnace was turned off, and the resulting coated article was allowed to cool in the furnace for 1 hour, after which the coated article was taken out of the furnace and left to stand in a 25° C. room and thereby slowly cooled.

Example 2

<Method for Producing Electrostatic Powder Coating Material of Example 2>

Glass particles (A): GLASS FRIT 9079-150 manufactured by AGC Inc. (softening point=344° C., median diameter d50=13.0 μm, linear expansion coefficient=$12.2\times10^{-6}$/K) and glass particles (B): hollow glass beads SPHERICEL 45P25 manufactured by Potters-Ballotini Co., Ltd. (softening point=830° C., median diameter d50=27 μm, pressure resistance=28 MPa) were mixed at a ratio (A):(B) of 80% by weight: 20% by weight using a container rotary mixer, and the resulting mixture was used as the electrostatic powder coating material of Example 2.

<Method for Producing Coating Film Using Electrostatic Powder Coating Material of Example 2>

The thus prepared electrostatic powder coating material of Example 2 was sprayed to the article to be coated, which was horizontally placed, from directly above using an electrostatic powder coating apparatus GX-8500αβ and an electrostatic powder coating gun (slit nozzle) GX132 that were manufactured by Parker Engineering Co., Ltd. In this process, the gun voltage, the gun current value, the discharge amount of the coating material and the air flow rate for transferring the coating material were set at 100 kV, 35 μA, 50% and 50 L/min, respectively, and the distance between the nozzle of the gun and the article to be coated was set at 300 mm.

Subsequently, the article to be coated that was sprayed with the electrostatic powder coating material of Example 2 was baked in an electric muffle furnace. As for the baking conditions, the baking temperature was 400° C., the heating time was 30 minutes, and the retention time at the baking temperature was 1 hour. After the baking, the power of the furnace was turned off, and the resulting coated article was allowed to cool in the furnace for 1 hour, after which the coated article was taken out of the furnace and left to stand in a 25° C. room and thereby slowly cooled.

Example 3

<Method for Producing Electrostatic Powder Coating Material of Example 3>

Glass particles (A): GLASS FRIT LS-5-300M manufactured by AGC Inc. (softening point=575° C., median diameter d50=10.0 μm, linear expansion coefficient=$10.5\times10^{-6}$/K) and glass particles (B): porous spherical silica H-51 manufactured by AGC Si-Tech Co., Ltd. (softening point=1,650° C., median diameter d50=5 μm, pressure resistance=40 MPa) were mixed at a ratio (A):(B) of 85% by weight: 15% by weight using a container rotary mixer, and the resulting mixture was used as the electrostatic powder coating material of Example 3.

<Method for Producing Coating Film Using Electrostatic Powder Coating Material of Example 3>

The thus prepared electrostatic powder coating material of Example 3 was sprayed to the article to be coated, which was horizontally placed, from directly above using an electrostatic powder coating apparatus GX-8500αβ and an electrostatic powder coating gun (slit nozzle) GX132 that were manufactured by Parker Engineering Co., Ltd. In this process, the gun voltage, the gun current value, the discharge amount of the coating material and the air flow rate for transferring the coating material were set at 100 kV, 35 μA, 50% and 50 L/min, respectively, and the distance between the nozzle of the gun and the article to be coated was set at 300 mm.

Subsequently, the article to be coated that was sprayed with the electrostatic powder coating material of Example 3 was baked in an electric muffle furnace. As for the baking conditions, the baking temperature was 650° C., the heating time was 1 hour, and the retention time at the baking temperature was 1 hour. After the baking, the power of the furnace was turned off, and the resulting coated article was allowed to cool in the furnace for 2 hours, after which the coated article was taken out of the furnace and left to stand in a 25° C. room and thereby slowly cooled.

<Evaluation of Coating Films>

Film thickness: The film thickness was measured using an eddy-current coating thickness tester LH-200J manufactured by Kett Electric Laboratory. The coated portion of each coated article was divided into three equal parts, the film thickness was measured at 5 spots in each of these parts, and an average of the values measured at a total of 15 spots was defined as the film thickness.

Void ratio: A micrograph of a coating film cross-section was taken, the ratio of the area of the glass particles (B) with respect to a prescribed coated area was determined for three coated portions that were arbitrarily selected, and an average of the thus determined ratios was calculated as the void ratio.

Presence or absence of crack generation after baking: After each coating film was baked, the surface thereof was observed under a bench-top microscope TM-3000 manufactured by Hitachi High-Technologies Corporation to verify the presence or absence of crack generation.

Adhesion of coating film: The adhesion of each coating film was evaluated in accordance with JIS K 5600-5-6:1999 "Testing Methods for Paints (Part 5: Mechanical property of film and Section 6: Adhesion test (Cross-cut test))". On the coating film of each coated article, cuts were made using a utility knife in the form of a grid having 5×5 (25) 2-mm square cells. A cellophane tape of 24 mm in width was adhered to the thus cut portion and then peeled off. When the coating film of the grid portion of the coated article partially adhered to the cellophane tape, the ratio of the coating film remaining on the coated article was calculated as a residual ratio, which was evaluated based on the following criteria.

(Evaluation Criteria)

S: The residual ratio was 90% or more and 100% or less (most favorable residual ratio).

A: The residual ratio was 70% or more and lower than 90%.

B: The residual ratio was 50% or more and lower than 70%.

C: The residual ratio was lower than 50%.

<Heat Resistance of Coating Film>

The coated articles having various coating films that were produced using the respective electrostatic powder coating materials of Examples 1 to 3 were each heated for 6 hours at the temperature shown below and then taken out, after which the surface of each coating film was observed to verify the presence or absence of crack generation. It is noted here that the heating was performed at the same temperature as the baking temperature using the above-described electric muffle furnace. This heating by the electric muffle furnace was performed at the maximum output of the electric muffle furnace. After the completion of the heating, the inside of the furnace was cooled to lower than 300° C. over a period of 3 hours. Thereafter, each coated article was taken out of the furnace, and left to stand in a 25° C. room and thereby slowly cooled. The presence or absence of crack generation was verified by observing the surface of each coating film under the above-described bench-top microscope.

The evaluation results of the coating films of Examples are shown in Table 1.

TABLE 1

| | Average film thickness (μm) | Void ratrio (vol %) | Crack generation after baking | Adhesion of coating film | Heat resistance of coating film: Conditions of heat resistance test | Heat resistance of coating film: Crack generation after heat resistance test |
|---|---|---|---|---|---|---|
| Example 1 | 82 | 50 | none | S | 500° C., 6 hours | none |
| Example 2 | 425 | 32 | none | S | 400° C., 6 hours | none |
| Example 3 | 94 | 18 | none | S | 650° C., 6 hours | none |

As shown in Table 1, it is seen that the electrostatic powder coating materials of Examples in which two kinds of glass particles were used are all capable of producing a coating film having excellent heat resistance.

The present invention has been described above in detail referring to concrete examples thereof; however, it is obvious to those skilled in the art that various modifications and changes can be made without departing from the gist and the scope of the present invention. The present application is based on Japanese Patent Application No. 2017-135892 filed on Jul. 12, 2017, and the entirety thereof is hereby incorporated by reference.

The invention claimed is:

1. An electrostatic powder coating material, comprising at least glass particles (A) and glass particles (B) which have different softening points, the powder coating material being capable of forming a coating film on an article to be coated by baking, wherein the glass particles (A) soften at a baking temperature, while the glass particles (B) do not soften at the baking temperature, and wherein the electrostatic powder coating material contains no resin.

2. The electrostatic powder coating material according to claim 1, wherein the glass particles (B) are glass particles having pores and/or voids.

3. A method for producing a coated article having a coating film, the method comprising: a step of applying, by an electrostatic powder coating method, the electrostatic powder coating material according to claim 1 onto an article to be coated; and a step of baking the thus applied electrostatic powder coating material at a baking temperature.

4. A coated article having a coating film, which is obtained by forming the coating film by a process comprising: a step of applying, by an electrostatic powder coating method, the electrostatic powder coating material according to claim 1 onto an article to be coated; and a step of baking the thus applied electrostatic powder coating material at a baking temperature.

* * * * *